June 12, 1962   R. C. BENTON   3,039,033
SERVOSYSTEM FOR TELESCOPED COMMAND AND FOLLOWING
SHAFTS WITH SERVOMOTOR DRIVE CONTROL
Filed Oct. 29, 1959   3 Sheets-Sheet 1

INVENTOR.
Robert C. Benton

BY
Webb, Mackey & Burden
HIS ATTORNEYS

June 12, 1962  R. C. BENTON  3,039,033
SERVOSYSTEM FOR TELESCOPED COMMAND AND FOLLOWING
SHAFTS WITH SERVOMOTOR DRIVE CONTROL
Filed Oct. 29, 1959  3 Sheets-Sheet 2

INVENTOR.
Robert C. Benton
BY Webb, Mackey & Burden
HIS ATTORNEYS

United States Patent Office 3,039,033
Patented June 12, 1962

3,039,033
SERVOSYSTEM FOR TELESCOPED COMMAND AND FOLLOWING SHAFTS WITH SERVOMOTOR DRIVE CONTROL
Robert C. Benton, State College, Pa., assignor to Centre Circuits, Inc., Pine Grove Mills, Pa., a corporation of Pennsylvania
Filed Oct. 29, 1959, Ser. No. 849,533
17 Claims. (Cl. 318—31)

This application relates to a synchronous torque amplifier having an exceptionally high frequency responsiveness and providing substantial torque amplification. These characteristics make it adaptable to machine tool control systems, particularly a type with which the present amplifier is primarily adapted to control continuous path milling machines, for example.

In essentials, this amplifier provides follow-up mechanism in which a power-driven shaft or following member is caused to operate in accordance with a second member, the controlling member. A power-actuating means provided for driving the following member, causes that member to accurately duplicate motion of the second member through a sensitive control arrangement; and in the latter connection, certain sets of flux conducting insert elements are provided on a pair of interfitting shaft members. More specifically, one of these sets of elements consists of steel buttons inserted in the following shaft member and bodily movable by the power-actuating means to which that shaft member is appropriately connected. The other set consists of steel pins which are carried by the second shaft member at skew angles in portions thereof so that each skewed pin will partially align at each end with a companion button insert on the following shaft member.

When relative rotation of the second shaft member causes one pin in the pin set to move to a greater satisfied position more closely confronting the buttons with which it is aligned in comparison to another pin which simultaneously moves, the permeance of the flux conducting path of the first pin is increased at the expense of said other pin whose path offers proportionally greater reluctance than before. A permeance-reluctance responsive device which is provided as part of the controls for the power-actuating means causes the following member and the buttons to be moved in one direction when the first pin takes the more satisfied position of alignment and in the opposite direction when the other pin takes the more satisfied position.

By analogy to a degree to a phonograph pick-up in recorded sound terminology, the foregoing pin and button inserts produce in effect a flux valve function, and it has a most advantageous application and benefits in the present subject matter of position detecting compared to conventional control devices such as mechanical switches or finder switches used in prior position-detecting apparatus. In the first place, there is substantially no mechanical coupling active as a drag between the following and second shafts so that in a physical sense, the second shaft essentially floats free. Moreover, there is no need for physical contact or appreciable mechanical travel for sensitivity purposes; as a matter of measurement, a change in ten minutes in relative angularity between the present following shaft and second shaft produces changes as high as 6000:1 readable in the reluctance path of the magnetic circuits. In view of this lack of physical drag, the torque multiplication based on what the power-actuating means delivers runs as high as approximately 50,000:1 depending on the installation. Response is exceedingly fine inasmuch as the use of higher flux frequencies in the reluctance path causes phase and time lag to diminish to practically an insignificant value.

The practical importance, to use the continuous path milling machine referred to as an example, is that the following shaft can readily duplicate the second shaft movements even though the latter is oscillated rapidly, e.g., at 50 c.p.s., whereas with exceedingly low inertia parts and appropriate adjustment, that response can be increased enabling the shafts to follow one another when the disturbing force has a much higher order frequency, e.g., approximately 150 c.p.s. Thus, a milling cut can be performed at a very rapid rate so that a sine wave, for instance, can be milled into the profile of a master template and with excellent repeatability at the frequencies just named because there is no appreciable phase lag in the position of the milling tool.

Hitherto, a commercially obtainable frequency response of machine tools to an input of 6–10 c.p.s. was considered a favorable attainment in the practice. By the present improvement, intricate contours can be generated by feeding input signals into the instant torque amplifier much more rapidly than hitherto and, thus, the work capacity per hour can be appreciably increased in machine tool operations. The output torque is applied through appropriate linkage to retractively and extensibly move the milling cutter into the proper momentary positions of cut; this torque and its use for physical positioning are in no way to be confused with the applied torque and turning speed of the cutter teeth which are controlled in customary way by the operator as formerly.

As above indicated, the present torque amplifier is primarily adapted for machine tool controls, principally in milling machines, but it is equally adapted to accomplish other positioning or drive providing work broadly, where high torque amplification and rapid, accurate response characteristics are desired.

Further features, objects and advantages will either be specifically pointed out or become apparent when for a better understanding of the invention, reference is made to the following written description taken in conjunction with the accompanying drawings, in which.

Figure 1:
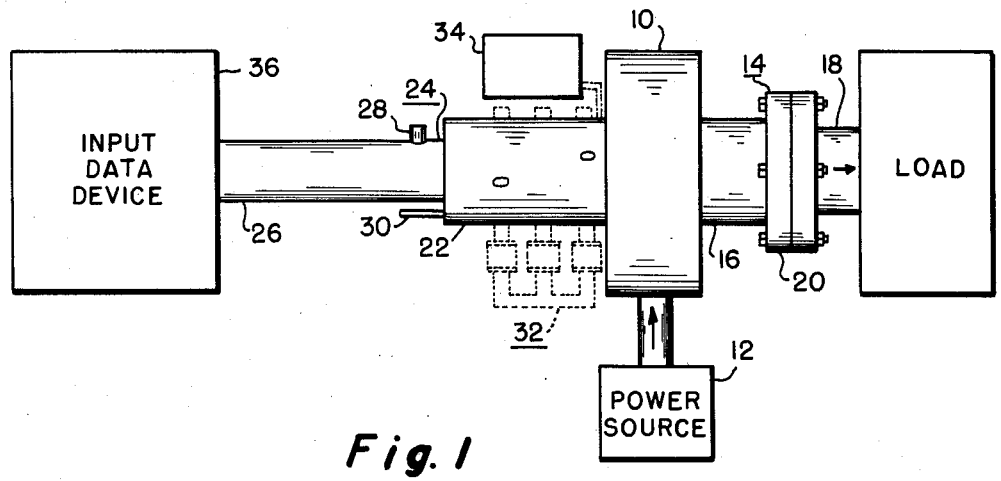
FIGURE 1 is a diagrammatic longitudinal view showing a synchronous torque amplifier embodying the present invention.

More particularly in FIGURE 1, a synchronous torque amplifier is shown having a hysteresis clutch device 10 for coupling a mechanical power source 12 so as to drive a load through an output or following member 14. The following member 14 consists of a clutch shaft 16, a shaft 18 which is connected to the load, and an alignment coupling 20 securing the two shafts together.

The following member 14 has a hollow shaft portion extending on the opposite side of the hysteresis clutch device 10 and forming an antifriction joint indicated generally by 24 with a second shaft member 26. A pin 28 fast to the second shaft member 26 engages a pin 30 affixed to the shaft portion 22 to coarsely delimit the overall freedom of relative rotation therebetween at the joint 24.

A sensitive transformer and flux valve mechanism, indicated in part by dotted lines 32 in FIGURE 1, is provided to determine accurately the phase lag and follow-up in the joint 24. An electrical system 34 which operates in response to the transformer and flux valve mechanism 32 is provided for applying electric power to control the clutch device 10 and associated mechanical system for automatically insuring that the following member 14 duplicates rotative motion of the second shaft member 26 in synchronism therewith.

In operation, the position of the second shaft member 26 is mechanically dictated by an input data device. The block 36, indicative of input data device, represents any device receiving information from a template and mechanical follower, or from machine tool control cards or tape or the like, and the mechanical force which it exerts on the second shaft 26 to reach the positions dictated is in the comparative sense very low. Under control of the electrical system 34, the clutch device 10 is connected thereto for applying the power of the power source 12 with the proper force and sense against the load so as to move the following member 14 in one direction when the second shaft member 26 deviates in its rotational position in one sense at the joint 24 and in the opposite direction when the second shaft deviates at the joint in the opposite sense. Thus, the load which can consist of a milling cutter in a continuous path milling machine, for example, will accurately and rapidly describe the right locus of positions for performing or repeating a milling cut.

The exceedingly low drag in the joint 24 compared to the capacity of a conventional mechanical power source indicated at 12 enables an overall torque multiplication of approximately 50,000 to 1 to be realized.

Figure 2:
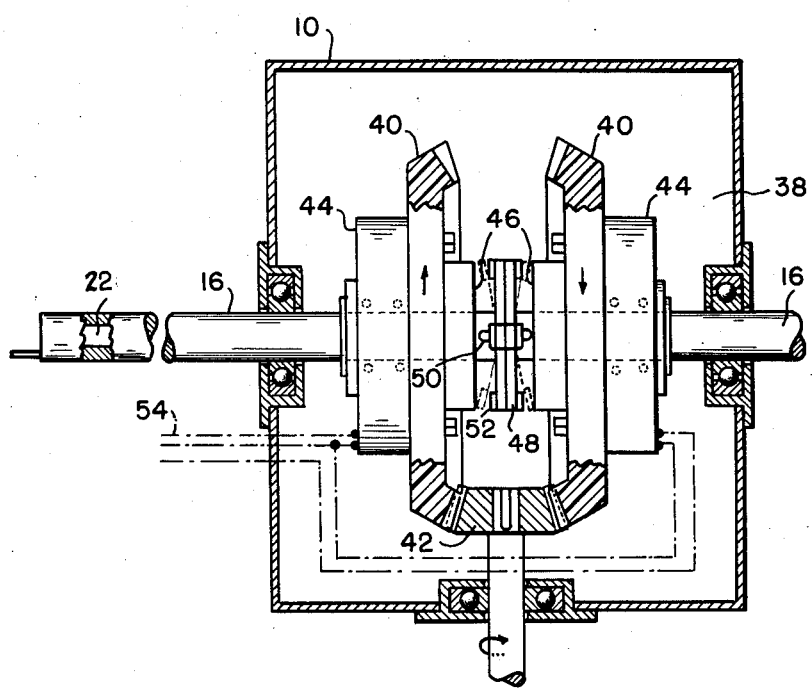
FIGURE 2 is a schematic longitudinal cross sectional showing of a bidirectional clutch device appearing in FIGURE 1.

In FIGURE 2, the hysteresis clutch device 10 has a fixed housing defining a fluid-tight chamber 38 containing differential gearing. The chamber 38 holds liquid both to cool and lubricate the gearing which in essentials consists of a pair of oppositely rotating side gears 40 meshing with a common bevel pinion 42 which is continuously rotated by a mechanical power source, not shown. Each side gear 40 is made fast by bolts to an individual coil clutch 44 which is supported on ball bearings for independent rotation on the common clutch shaft 16. The coil clutches 44 each present an individual ceramic face plate 46 at their inner end.

A bipartite clutch disk 48 consisting of two sections back to back is keyed at 50 to the clutch shaft 16 at an included point in confronting relation to the face plates 46. The showing of the disk 48 is largely schematic and in actual practice it presents a plurality of individual radially extending arms each carrying a wear surface pad 52 and deflectable into the dotted line positions shown so as to drag with variable pressure against the companion surface of the adjacent face plate 46. The disk is of magnetic material and under actuation of the magnetic flux from the coil clutches 44, functions as a highly effective slip clutch with low deenergized drag characteristics.

A hysteresis slip clutch of the type manufactured by Normal H. Hardy Associates, Bryn Mawr, Pennsylvania, has been found entirely satisfactory for present purposes. An input of two milliwatts on a clutch of this type controls approximately 100-pound inches of torque output exerted on the output end of the clutch shaft 16. This particular make of clutch is thus highly sensitive and has been found to operate with excellent bidirectional characteristics.

In operation of the clutch device 10 of FIGURE 2, the coil clutches 44 are normally deenergized so that they have practically no holding power and, therefore, a minimum of residual drag. When either coil clutch 44 is selectively energized through its respective electrical leads 54, it causes the arms on the adjacent section of the clutch disk 48 to deflect and set up a drive in the direction of rotation of the associated side gear 40 but with appropriate slip depending on the degree of energization of the coil clutch. By way of specific example, if the input bevel pinion 42 is rotating at 1000 r.p.m. in the direction shown in FIGURE 2, the side gears 40 will have rotation in the direction of the arrows shown at the left and right and with a desired speed dependent upon the selected gear ratio, for example, 400 r.p.m. Thus, the maximum speed of rotation of the clutch shaft 16 will be 400 r.p.m. which with 50% slip would amount to 200 r.p.m. and extending as low as zero r.p.m. at 100% slip of both clutches; in this specific example, the hollow shaft portion 22 will be able to duplicate the position dictated to the second shaft, not shown, at the rate of 400 r.p.m. in either direction or at some percentage thereof as necessary.

Figure 3:
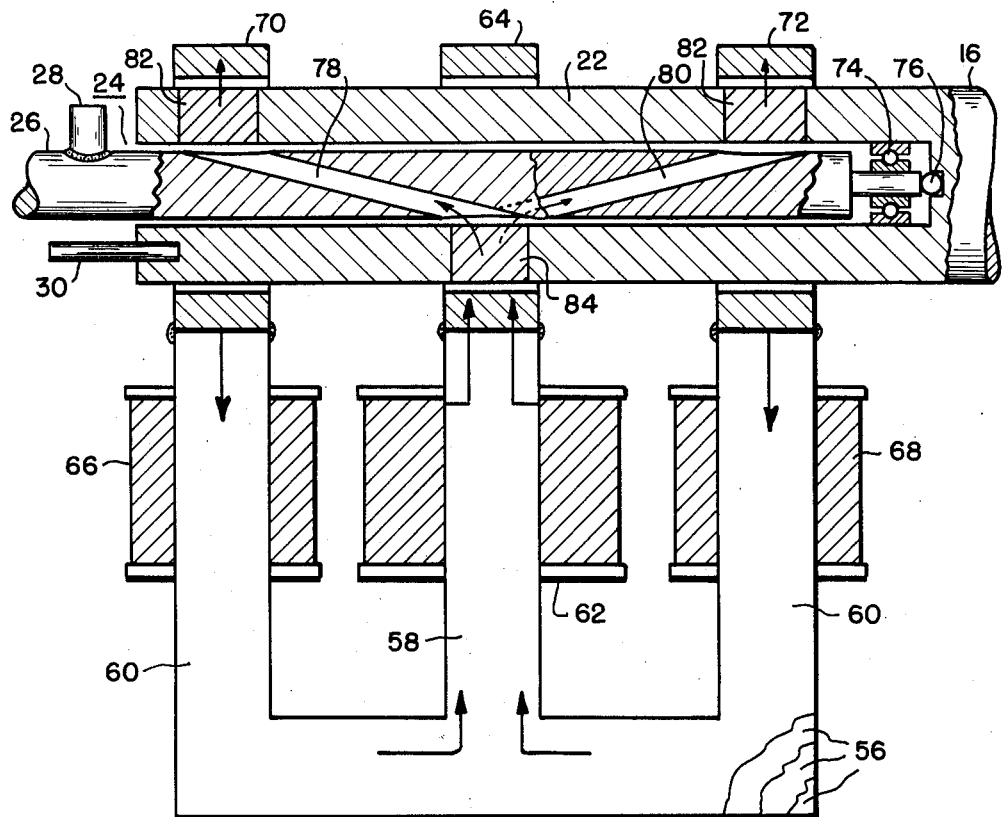
FIGURE 3 is a longitudinal cross sectional view in the vicinity of the joint between the following and second shafts in the torque amplifier of FIGURE 1.

In the transformer and flux valve mechanism of FIGURE 3, a core consisting of E-section laminations 56 presents a center leg 68 disposed parallel to and between a pair of end legs 60. In one physically constructed embodiment of the invention, there were sufficient laminations 56 to give the core a thickness of ¼".

The center leg 58 carries an input coil 62 and at the extremity it carries a magnetic slip ring 64 which surrounds the shaft portion 22 and shaft member 26 in spaced-apart relationship at a point adjacent their common joint 24. The outer legs 60 in similar fashion carry a pair of individual output coils 66 and 68 and a pair of respective magnetic slip rings 70 and 72.

The antifriction joint 24 includes a radial pilot bearing 74 in the floor of the hollow shaft portion 22 and a thrust bearing 76 thereadjacent which rotatably supports the second shaft 26 in alignment so as to be concentric to the slip rings 64, 70 and 72. The second shaft member 26 is drilled with two non-intersecting bores, and two pin inserts 78 and 80 are press-fitted into the bores, being made of para-magnetic material. The pins 78 and 80 are transversely aligned with one another at their inner end, but due to their skewed relationship to the shaft member 26, they diverge at their outer end into the respective planes of the magnetic slip rings 70 and 72.

A pair of button inserts 82 of paramagnetic material is press-fitted into the hollow shaft portion 22 at a point so as to align in the plane of the respective rings 70 and 72 and another pair of magnetic buttons 84 is press-fitted into adjacent bores in the hollow shaft portion 22 at points in the common plane of the magnetic slip ring 64.

Following is an example of the dimensions and specifications of the transformer and flux valve mechanism of FIGURE 3:

| | |
|---|---|
| Inner telescoped shaft 26 | ¼" O.D. |
| Outer telescoped shaft portion 22 | ¾" O.D. |
| Pin inserts 78 and 80 | ⅛" O.D. |
| Button inserts 82 | ¼" O.D. |
| Telescoped shaft stock | Preferably brass but light diamagnetic metals such as aluminum, and plastics such as glass reinforced phenolic are satisfactory. |
| E-section laminations | 2½" long x 2" wide. |
| Input coil 62 | 3,000 turns, 36-gauge copper wire. |
| Output coils 66, 68 | each 1,600 turns, 36-gauge copper wire. |
| Normal energization input coil 62 | 0.1 amps. at 90 volts A.C. |
| Voltage across output coils 66 and 68 when in balance | 47 volts apiece. |

Figure 4:
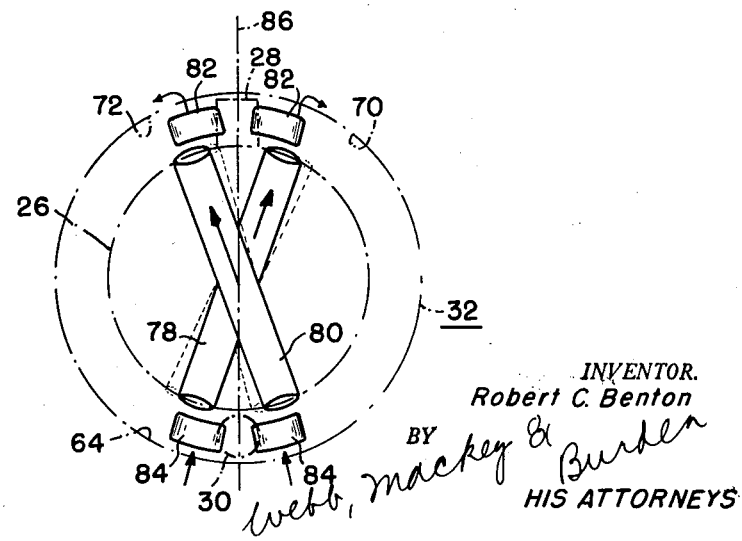
FIGURE 4 is a schematic view of aid in explaining the operation of flux valve elements carried by the shafts of FIGURE 3.

FIGURE 4 which is a schematic representation of the moving shaft parts of FIGURE 3 viewed endwise, shows the respective inserts 78, 80, 82 and 84 in their operative disposition, these inserts being high permeability metal such as silicon steel which has known strong magnetic properties. At their inner end (or lower end as viewed in FIGURE 4), the pin inserts 78 and 80 are transversely aligned with one another in the plane of the ring 64. At its opposite end, the near pin 80 is transversely aligned in the plane of the ring 72 whereas the pin 78 is in the plane of the magnetic slip ring 70. With a different ring 64, 72 confronting the near pin 80 at each end, that pin together with the companion button insert 82 or 84 at that end, forms a set of flux valve elements precisely controlling the permeability in the flux path gap between the main magnetic rings. By a similar registry at its ends, the pin 78 together with the companion button inserts 82 and 84 at those ends forms a controlled flux valve path between the rings 64 and 70. When the valve elements are symmetrically disposed with respect to a temporary reference axis 86 as viewed in FIGURE 4, it will be noted that the ends of the pins do not precisely align with the buttons at that end; and, thus, there exists an equal and opposite balancing force whereby each set of pins and buttons attempts to more nearly align itself in its magnetic field to a more satisfied position as between the continuous inner peripheries of the annular magnetic slip rings.

In function, the fixed pins 28 and 30 previously described form a mechanical interconnection physically preventing the inner telescoped shaft from taking a lead of more than about 175 or 180° with respect to the outer telescoped shaft. The function of the flux valve elements, however, is much more sensitive when, for instance, they take a lead angle to a position clockwise as shown in dotted lines in FIGURE 4. In that instance, the near pin 80 more nearly aligns in its magnetic flux path so as to reduce the reluctance thereof, whereas the pin 78 is misaligned further as a permeability member and thereby it increases the reluctance between the rings 64 and 70. In one physically constructed embodiment of the invention, a change of ten minutes in angularity produced a resultant change in the ratio of 6,000 to 1 as between the reluctance in the separate magnetic circuits and this sensitivity enabled exceedingly fine response characteristics to be realized in the follow-up motion desired.

In operation of the transformer and flux valve mechanism of FIGURES 3 and 4, the input coil 62 is energized to introduce A.C. flux into the center leg of the transformer core first in the direction of the arrows and then in the opposite direction at a stable frequency. The resulting alternating flux communicated to the outer legs 60 of the transformer core creates an induced voltage across the output coils 66 and 68 of equal magnitudes to one another. As long as the telescoped shaft portions stationarily occupy their solid line positions of FIGURE 4 or are rotated at the same speed and sense to retain that relative position, the output voltage of the respective output coils 66 and 68 remains in balance. The output coils are so connected, however, as to apply the voltage in opposing relation to an amplifier which in turn controls the mechanical power means including the clutch device 10 in its force and sense; and in this fashion, the power-actuating means is operated in one direction when certain companion elements among the two flux valve sets establishes a more satisfied position of alignment in the flux path and in the opposite direction when the other compannion elements of the two sets takes the more satisfied position of alignment.

Figure 5:
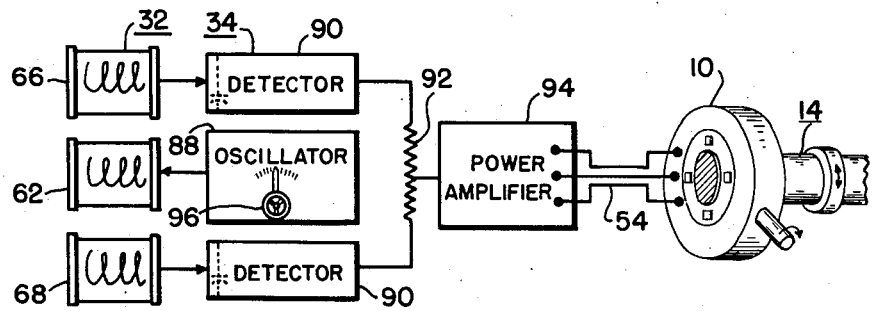
FIGURE 5 is a block circuit diagram of the electrical control system for the torque amplifier.

In FIGURE 5, the electrical system 34 which is responsive to the transformer and flux valve mechanism 32 for controlling the mechanical system includes an oscillator 88 connected to apply an A.C. voltage to the input coil 62. The induced voltage from the output coils 66 and 68 is applied to a pair of individual detector circuit units 90 each containing the usual capacitors as indicated by dotted lines and also inductors, not shown, and diodes or rectifiers of other conventional types.

The respective detectors are connected to a common potentiometer 92 for a comparison of their output which is delivered to a balanced power amplifier 94 connected thereto. The power amplifier 94 receives an electrical signal of a proper force and sense dependent upon how far the output coils 66 and 68 are out of balance and in what way. The amplified signal is directed through the connections 54 to a selected clutch coil in the clutch device 10 for driving the following member 14 with the right force and sense. When there is no inequality in the voltage from the output coils 66 and 68, the clutch coils within the device 10 are substantially deenergized. Thus, each time the clutch device 10 restores the telescoped shafts to their normal position, the amplifier 94 is automatically rebalanced so as to deenergize the clutch coils.

Some means of adjusting the oscillating frequency such as a substitution of crystals or substituting capacitors of a different time constant or utilizing a variable frequency oscillator with adjusting means 96 as illustrated in FIGURE 5, enables an operating frequency to be established in the oscillator 88 which is preferably about ten times the desired frequency of response for the following member 14. Thus, in the interval of a very short time period several cycles of voltage will have occurred, rapidly bringing the capacitor plates of the detector circuit units up to charge. I have found that an oscillator frequency of one kilocycle works entirely satisfactorily; in fact, an oscillator frequency of 400 cycles per second is entirely adequate in most cases.

Figure 6:
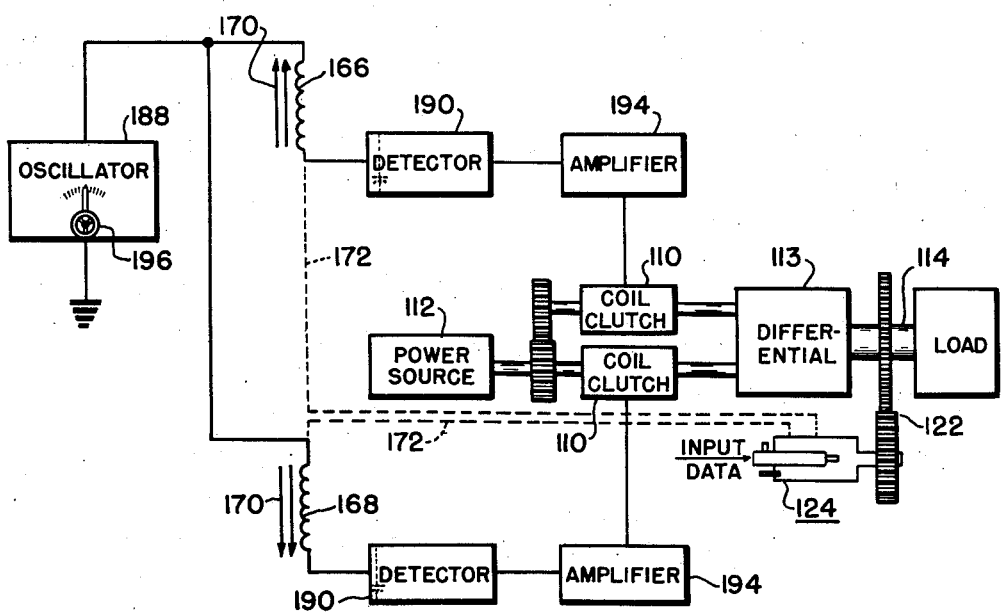
FIGURE 6 is an electromechanical diagram of a torque amplifier and control circuit of modified design.

In the modification of FIGURE 6, a mechanical power source 112 consisting of an electric motor, prime mover or the like, is connected through split-path reversing gearing and a pair of individual coil clutches 110 to a mechanical differential 113. The differential 113 operates a following shaft member 114 to drive a load with the proper force and sense. The following member 114 is drivingly connected by gearing 122 or otherwise to a pair of the telescopically interfitting shafts forming a joint 124 similar to the joint of the preceding embodiment and likewise receiving input data.

An oscillator 188 having a variable frequency adjusting device 196 is connected in common to a pair of output coils 166 and 168 arranged electrically in parallel in the output of the oscillator. These output coils 166 and 168 consist of variable inductors having adjustable cores partially indicated at 170. Actually, these cores 170 are associated in magnetic circuits indicated by dotted lines at 172 with the telescoping shafts so as to be subject to the requisite reluctance control. Thus, the consolidated magnetic circuits 172 can effectively create inequality in the inductive reactance of the two output coils 166 and 168 so as to change the coil impedance and coil output.

Although in practice, the output coils 166 and 168 can be wound on separate cores each gapped to operatively receive a different one of the pin and button sets (not shown) in the telescoped shafts, it is preferable to follow as closely as possible the essentially compact arrangement of FIGURE 3 preceding. That is to say, the user can modify the prior FIGURE 3 embodiment to full satisfaction for present purposes of FIGURE 6 by disconnecting, if not altogether omitting, the center coil 62 from FIGURE 3. This modification, while it effects a saving in space and materials by making the inductor coils 166 and 168 share a common core on the center leg and also the center ring 64 is mutually shared thereby, nevertheless enables these coils to establish individual magnetic circuits separately controllable by the respective pins and companion buttons forming the flux valve control elements. Each output coil controls a different coil clutch 110 through a circuit including a detector 190 and a power amplifier 194.

As in the preceding embodiment, the concentric load-connected and dictator-connected shafts of FIGURE 6 are arranged to extend in opposite directions from an area common to and occupied by substantial portions of both shafts in the vicinity of their joint 124. In the preceding manner, unilateral rotation of displacement of either shaft with respect to the other creates an inequality in the output of inductor coils 166 and 168 through varying their inductance reactance so as to change impedance in the output. The amplifiers 194 are adjusted so that balanced coil output introduces a holding power in the clutches which is approximately 5% of full power. Under these circumstances, the drag in the coil clutches is low. When a substantial output torque is called for, current in one clutch rises to full power or some proportion thereof while the current in the other clutch reduces to approximately zero, e.g., ½ percent of full power. It is apparent that due to the gearing 122, the following shaft rotates not only at a different geared speed from the shafts forming the joint 124, but also always in the opposite direction from them.

The sensitivity of the flux valve mechanism to small movements in the shaft joints hereof has been described. The ten-minute movement specifically referred to constitutes a major movement and yet on the outside diameter of the second shaft 26 as it deviates this movement is hardly perceptible. In other words, a full ten minutes of rotation of the ¼" shaft of FIGURE 4 causes its periphery to move less than 0.0004", which would require considerable motion magnifying linkage connected thereto for producing a reading that meant much. However, the user of the present mechanism can apply the broader principles thereof as a method of detecting very small movements of a moving member either way with respect to a reference member which is adjacent thereto or with which it forms an indicator joint, either spring-loaded or unloaded. Thus the user, after a split-path, coil-carrying magnetic core is operatively associated with the joint following provision of appropriate flux valve elements in the latter, can direct pulsating flux in the split magnetic paths so that the flux portions are divided, and thereupon derive disproportionate control voltages from said coils as a function of small movements of the moving member at the joint and varying as a function of the inequality in outputs of said coils caused by corresponding movement of the flux valve elements. Whether as derived they are additionally employed for utility purposes to operate other equipment as here or not, these control voltages can be readily measured on a meter for comparison purposes to give an insight on the performance of the shafting. For instance, if the shafting contains a calibrated spring-loaded coupling at the joint, the proportionate coupling deflection and corresponding shaft torque can be ascertained as a continuous reading while the shafting is transmitting power.

Variations within the spirit and scope of the invention described are equally comprehended by the foregoing description.

I claim:

1. A follow-up mechanism for causing one shaft member to operate in accordance with a second one, comprising, in combination therewith, a shaft portion telescopically interfitting with a portion of said second shaft member, and each made of substantially diamagnetic material, a set of movable flux path defining pin elements carried by the just-said portion of the second shaft member, a set of movable buttons cooperating to complete the flux paths of the first-mentioned elements and carried by the first-mentioned shaft portion so as to move relative to the set of first-mentioned elements, power means comprising a bidirectional clutch device and connected to move said one shaft member and said first-mentioned shaft portion concurrently, and flux-valve-path responsive control mechanism for the power means operatively including the flux paths defined by said buttons and pin elements and connected to effect operation of the power means by controlling the force and sense thereof, said one shaft member being connected to a load and said power means being coupled to the former by said clutch device for bidirectionally causing said member to drive the load with the force and sense aforesaid.

2. In a follow-up mechanism, a position-indicator and a position-follower formed by a pair of telescoped diamagnetic shafts, a plural leg, gapped-core transformer arranged with gaps between the legs and coils thereon individual to the legs, flux valve elements carried by said shafts in an operative disposition amongst and changing the alignment of the flux gaps between said transformer legs, an output-providing balanced amplifier, means forming a separate number of connections between said output amplifier and a proportionate number of said plural coils, and an oscillator which is connected to a different one of said coils and the output energy of which is delivered therethrough to said amplifier so as to unbalance it in response to each unilateral deviation of said position-dictator shaft and to forthwith rebalance same in response to following movement of the follower readjusting the alignment of the flux gaps so as to restore properly divided distribution of said oscillator output energy.

3. In a follow-up mechanism, a position dictator and a position follower formed by a pair of telescoped shafts of substantially diamagnetic material, a plural leg, gapped-core transformer with the gaps between the legs, said transformer arranged with coils individual to the legs and with magnetic slip rings fast thereto and common to said shafts in surrounding relation to the latter, flux valve elements of paramagnetic material carried by said shafts in an operative disposition amongst and controlling the flux gaps between said transformer slip rings, an output-providing balanced amplifier, means forming a number of separate connections between said output amplifier and a proportionate number of said plural coils, and an oscillator which is connected to a different one of said coils in said transformer and the output energy of which is transformed and delivered to said amplifier so as to unbalance it in response to each unilateral deviation of said position-dictator shaft and to forthwith rebalance same in response to readjustment of the flux gaps due to following movement of the follower so as to restore properly divided distribution of said oscillator output energy.

4. In a follow-up mechanism, a single E-section gapped-core means with gaps between the legs, said core means arranged with coils individual to the legs thereof and including a plurality of balanced output coils, and pluralities of individual ferromagnetic flux valve elements supported for rotation adjacent the legs for controlling said flux gaps therebetween, with the elements of each plurality being variably alignable with one another in a manner creating inequality of output from the associated output coils.

5. In an actuator for use in establishing control between a dictator and a power-actuated follower, said follower having power-actuating means for operating said follower to bidirectionally drive a load with controlled force and sense, the improvement in the actuator for said means comprising in combination, a concentric pair of respectively load-connected and dictator-connected shafts arranged to extend in opposite directions from an area common to and occupied by substantial portions of both shafts, leg-carrying core means presenting spaced-apart portions arranged to surround said shafts at points confined to the vicinity of their common area so that the aforesaid portions of the shafts intervene to define controllable flux gaps, paramagnetic inserts physically forming a part on said shaft portions, which shaft portions rotatably carry same and which for their major portion consist of a material of diamagnetic properties preventative of interference with the influence of each paramagnetic insert effectively present and controlling said flux gaps, and energizable actuator coils, each of which is connected to a leg of the core means and the output of which is a function of the differential action of the paramagnetic inserts in said flux gaps so as to control the force and sense aforesaid of the power actuating means.

6. In a follow-up mechanism, a position dictator and a position follower formed by a pair of telescoped shafts of substantially diamagnetic material, a plural leg, gapped-core, transformer with gaps between the legs, said transformer arranged with coils individual to the legs and with magnetic slip rings fast thereto and common to said shafts in surrounding relation to the telescoped portion of the latter, flux valve elements of paramagnetic material carried by said shafts in an operative disposition amongst and changing the alignment of the flux gaps between said transformer slip rings, means responsive to flux distribution in said flux gaps as relatively aligned, and means for introducing flux in said transformer for rendering said flux responsive means sensitive to each unilateral deviation of said position-dictator shaft as a function of change of alignment of said flux gaps.

7. In a follow-up mechanism, first and second relatively rotatable means capable of limited movement of angular displacement therebetween, a constantly operating power source for moving the first means, mechanical means drivingly connected to said second rotatable means to force it to deviate in its rotational position, and rotational position-sensitive power delivery structure comprising separate clutches connected for selectively applying no power and for applying power of the constantly operating power source to the first means in one direction when the second means deviates in its rotational position in one sense and in the opposite direction when the second means deviates in its rotational position in the opposite sense, there being an aligned relation of parts constituted by the clutches, a position-sensitive means in the power delivery structure, the first rotatable means, and the second rotatable means, all in coaxial arrangement to one another.

8. Follow-up mechanism comprising in combination, first and second relatively rotatable shafts having an overlapping joint therebetween journaling them in axial alignment to one another, a power source for moving the first shaft, magnetic signal developing and control means operated by the joint as a function of rotational deviations between shafts, and power delivery means connected in the output of the just-named means operated by said joint and connected for applying power of the power source to the first shaft in one direction when the second relatively rotatable shaft deviates in its rotational position in one sense at said joint and in the opposite direction when the second shaft deviates at the joint in the opposite sense.

9. Mechanism according to claim 8 wherein one of said shafts supports the other of the shafts at said joint to hold themselves in the aforesaid axial alignment, and a mechanical interconnection between said shafts to physically limit their maximum relative rotation at the joint.

10. In a follow-up mechanism for causing one member to operate in accordance with a second one, a set of first movable flux path defining elements, a diamagnetic shaft supporting the first said elements, another set of movable elements cooperating to complete the flux path of the first said elements and movable relative thereto, electrically-actuated power means connected to said diamagnetic supporting shaft to move the first said elements, means comprising a diamagnetic input shaft connected for mechanically forcing said other set of elements to change the relative alignment of said flux paths, and flux-valve path responsive control mechanism for the power means operatively including the flux paths of said elements in separate magnetic circuits therein and connected to effect operation of the power means in one direction when certain companion elements among the two sets establish a more satisfied position of alignment in their flux paths and in the opposite direction when other companion elements between the two sets take the more satisfied position of alignment.

11. Follow-up mechanism for causing one shaft member to operate in accordance with a second one, comprising a shaft portion telescopically interfitting with said second shaft member, a set of movable flux path defining elements carried by the second shaft member, said second shaft member and said shaft portion being made of substantially diamagnetic material, another set of movable elements cooperating to complete the flux paths of the first-mentioned elements and carried by said shaft portion so as to move relative to the set of first-mentioned elements, power means connected to move said one shaft member and said shaft portion, and flux-valve path responsive control mechanism for the power means operatively including the flux path of said elements in a magnetic circuit and connected to effect operation of the power means in one direction when certain companion elements among the two sets establish a more satisfied position of alignment in their flux path and in the opposite direction when other companion elements between the two sets take the more satisfied position of alignment.

12. In follow-up means providing a concentric arrangement whereby a first shaft is operated in accordance with a second shaft, said shafts having complementary diamagnetic portions which are telescoped to form a mutual joint, the combination with the joint comprising a position-dictator device within said joint and connected to said second shaft, a follower device within said joint connected to said first shaft, there being position-adjusting means coupled through said first shaft to the follower device to cause it to follow deviations in the position of the position-dictating device, a constantly rotating power source having a pair of magnetic clutches for intermittently coupling said power source to operate said position-adjusting means, said clutches being coaxial with respect to said position-adjusting means and said dictator and follower devices, a balanced amplifier for energizing said clutches, a fixed output-transformer, an oscillator for supplying the output-transformer, said output-transformer arranged with said devices being concentric thereto and with the output-transformer operatively linked therewith for distributing the output energy of said oscillator in moieties through said devices, means responsive to deviations in the distribution of output from said oscillator arising from contemporaneous deviations in said position-dictating device, for unbalancing said balanced amplifier, and means connecting each of said clutches and said amplifier whereby it selectively operates the clutches to restore said balance.

13. In a follow-up mechanism providing for one shaft member to be operated in accordance with a second one, said shaft members having diamagnetic portions telescoped to form a joint, a position dictator within said joint and connected to said second shaft member, a position follower within said joint connected to said one shaft member, a mechanical system connected to said one shaft member for operating the follower, and an electrical system responsive to the dictator for controlling the mechanical system comprising a balanced power amplifier, an oscillator, a fixed output-transformer arranged with said follower and dictator concentric thereto and being operatively linked through said follower to said dictator for distributing the output energy of said oscillator in moieties through said dictator, means responsive to deviations in the distribution of the output of said oscillator arising from contemporaneous deviations in said position-dictating device, for unbalancing said balanced amplifier, and means connecting the amplifier of said electrical system and the mechanical system whereby the amplifier operates the latter to restore said balance.

14. Shaft follow-up means comprising two diamagnetic shafts overlapping to form an interfitting joint, a pair of output coils having cores, coil-energized means including a pair of detectors in the output of said coils, a pair of magnetic coil clutches operating to provide opposing forces and coupled to the output of said coil-energized means, means comprising flux-operated shaft control mechanism in said joint whereby said clutches vary the relative output between said coils, said last-named means further comprising an oscillator, the output energy of which is applied to said coils so as to create oscillating flux in their cores, and means of establishing in said oscillator an operating frequency at least approximately ten times the desired frequency of response of the shaft mechanism to insure that the detectors build up to normal voltage without appreciable phase lag for each operation of the clutches.

15. Follow-up means whereby one member is caused to operate in accordance with a second one comprising a position-dictator device, a position-follower device, said devices having a mechanical interconnection to coarsely delimit their over-all freedom of relative rotation therebetween, and a magnetic-mechanical system responsive to the dictator device for accurately controlling the follower to a fine degree within those coarse limits comprising a balanced power amplifier, an oscillator, an oscillator output transformer arranged with the dictator and follower devices in concentric relationship thereto and being operatively linked through said follower with said dictator device for distributing the output energy of said oscillator in moieties through said dictator device, and means responsive to deviations in the distribution of the output of said oscillator arising from contemporaneous deviations in said position-dictator device, for unbalancing said balanced power amplifier, said power amplifier connected to control the operation of said magnetic-mechanical system to automatically restore said balance.

16. In a follow-up mechanism according to claim 4, the additional structure whereby said legs carry flux conducting ring portions arranged in aligned relation, and diamagnetic supporting members for carrying said flux valve elements and mounted to rotate within confines of the ring portions in coaxial relation to said ring portions and to one another.

17. A torque amplifying machine for doing work comprising first, second and third shafts which are axially aligned in that order, position-adjusting structure operatively connected to said second shaft and to said third shaft, said third shaft comprising a load-connected shaft for driving a load, overlapping portions of adjacent ends of said first and second shafts forming a joint by and between said first and second shafts and including a dictator structure in the first shaft and a follower structure in the second shaft, magnetic control means sensitive to low power exertions and comprising a transformer structure and operated in response to low power exertions manifested incident to the magnetic character of the devices in said joint, in dependence on deviations in their relative rotative position, and constantly rotating heavy power exerting means operated by said magnetic control means and connected by clutch structures in said position-adjusting structure to cause said second and third shafts and said load to be at rest, to move in a first direction, and to move in a second direction, the position-adjusting structure, the clutch structures therein, and the transformer, dictator, and follower structures all being ocaxial with said first, second and load-connected shafts of said machine.

References Cited in the file of this patent
UNITED STATES PATENTS

| | | |
|---|---|---|
| 1,763,000 | Marrison | June 10, 1930 |
| 1,873,609 | Locke | Aug. 23, 1932 |
| 2,425,733 | Gille | Aug. 19, 1947 |
| 2,447,496 | Depp et al. | Aug. 24, 1948 |
| 2,453,106 | Lardner | Nov. 2, 1948 |
| 2,462,095 | Halpert et al. | Feb. 22, 1949 |
| 2,476,496 | Kliever | July 19, 1949 |
| 2,484,022 | Esval | Oct. 11, 1949 |
| 2,506,798 | Lilja | May 9, 1950 |
| 2,510,707 | Markusen | June 6, 1950 |
| 2,697,214 | Smith | Dec. 14, 1954 |
| 2,725,510 | Reid | Nov. 29, 1955 |
| 2,754,465 | Brier | July 10, 1956 |
| 2,820,872 | Carr | Jan. 21, 1958 |
| 2,827,604 | Cloud | Mar. 18, 1958 |
| 2,852,726 | Ocnaschek | Sept. 16, 1958 |
| 2,922,939 | Carter et al. | Jan. 26, 1960 |
| 2,943,285 | Smith | June 28, 1960 |
| 2,980,837 | Wu | Apr. 18, 1961 |

OTHER REFERENCES

American Standard Definitions of Electrical Terms, Definition 05.25.065, page 48, A.I.E.E. Publication, 1942.